(12) United States Patent
Grancharov et al.

(10) Patent No.: US 11,430,449 B2
(45) Date of Patent: Aug. 30, 2022

(54) VOICE-CONTROLLED MANAGEMENT OF USER PROFILES

(71) Applicant: Telefonaktiebolaget LM Ericsson (publ), Stockholm (SE)

(72) Inventors: Volodya Grancharov, Solna (SE); Tomer Amiaz, Tel Aviv (IL); Hadar Gecht, Ramat-HaSharon (IL); Harald Pobloth, Täby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 41 days.

(21) Appl. No.: 16/644,200

(22) PCT Filed: Sep. 11, 2017

(86) PCT No.: PCT/EP2017/072705
§ 371 (c)(1),
(2) Date: Mar. 4, 2020

(87) PCT Pub. No.: WO2019/048063
PCT Pub. Date: Mar. 14, 2019

(65) Prior Publication Data
US 2021/0027789 A1    Jan. 28, 2021

(51) Int. Cl.
*G10L 17/06*         (2013.01)
*G10L 17/22*         (2013.01)
*H04H 60/45*         (2008.01)

(52) U.S. Cl.
CPC ............... *G10L 17/06* (2013.01); *G10L 17/22* (2013.01); *H04H 60/45* (2013.01)

(58) Field of Classification Search
CPC .......... G10L 17/06; G10L 17/22; H04H 60/45
(Continued)

(56) References Cited

U.S. PATENT DOCUMENTS 6,415,257 B1   7/2002   Junqua et al.
6,418,424 B1   7/2002   Hoffberg et al.
(Continued)

FOREIGN PATENT DOCUMENTS

EP   2048656 A1   4/2009
WO   0195625 A1   12/2001

OTHER PUBLICATIONS

Obin, N. et al., "On Automatic Voice Casting For Expressive Speech: Speaker Recognition Vs. Speech Classification", 2014 IEEE International Conference on Acoustic, Speech, and Signal Processing (ICASSP), May 4, 2014, pp. 950-954, IEEE.
(Continued)

Primary Examiner — Edwin S Leland, III
(74) Attorney, Agent, or Firm — Coats & Bennett, PLLC

(57) ABSTRACT

A management of user profiles comprises calculating, for an audio segment, a user confidence measure representing a probability that the audio segment comprises speech of a user and a group confidence measure representing a probability that the audio segment comprises speech of a group of users. A user profile is then managed based on a comparison between the user confidence measure and a user confidence threshold and between the group confidence measure and a group confidence threshold. The embodiments thereby achieve an efficient voice-controlled user profile management by utilizing a layered approach that provides user profiles for group of users as fallback when the identity of the speaking user can not accurately be recognized.

13 Claims, 7 Drawing Sheets

(58) Field of Classification Search
USPC .......................................................... 704/231
See application file for complete search history.

(56) References Cited

U.S. PATENT DOCUMENTS

| | | | |
|---|---|---|---|
| 7,024,366 B1 | 4/2006 | Deyoe | |
| 20,170,076 | 11/2009 | Kompe et al. | |
| 9,363,155 B1* | 6/2016 | Gravino | G06Q 30/02 |
| 2004/0003392 A1* | 1/2004 | Trajkovic | H04N 21/4751 |
| | | | 348/E7.061 |
| 2004/0193426 A1* | 9/2004 | Maddux | H03M 7/3082 |
| | | | 704/275 |
| 2007/0198264 A1 | 8/2007 | Chang | |
| 2009/0119103 A1 | 5/2009 | Gerl et al. | |
| 2012/0136658 A1* | 5/2012 | Shrum, Jr. | G10L 17/00 |
| | | | 704/231 |
| 2012/0253811 A1 | 10/2012 | Breslin et al. | |
| 2015/0154002 A1* | 6/2015 | Weinstein | G06F 40/109 |
| | | | 715/728 |
| 2016/0291988 A1* | 10/2016 | Zimmermann | G06F 9/4411 |
| 2017/0076727 A1 | 3/2017 | Ding et al. | |
| 2018/0166066 A1 | 6/2018 | Dimitriadis et al. | |
| 2019/0043493 A1 | 2/2019 | Mohajer | |
| 2021/0027789 A1* | 1/2021 | Grancharov | H04H 60/45 |

OTHER PUBLICATIONS

Jin, Q. et al., "Speaker Segmentation and Clustering in Meetings", Interspeech 2004, Jan. 1, 2004, pp. 1-9, ISCA.

Booklet, T. et al., "Age and Gender Recognition For Telephone Applications Based on GMM Supervectors and Support Vector Machines", 2008 IEEE International Conferences on Acoustics, Speech and Signal Processing, Mar. 31, 2008, pp. 1605-1608, IEEE.

Reynolds, D. et al., "Robust Text-Independent Speaker Identification Using Gaussian Mixture Speaker Models", IEEE Transactions on Speech and Audio Processing, vol. 3 No. 1, Jan. 1, 1995, pp. 72-83, IEEE.

Reynolds, D., "Comparison of Background Normalization Methods for Text-Independent Speaker Verification", Eurospeech 1997, Sep. 22, 1997, pp. 1-4, ISCA.

Shirali-Shahreza, S. et al., "Parental Control Based on Speaker Class Verification", IEEE Transactions on Consumer Electronics, vol. 54 No. 3, Aug. 1, 2008, pp. 1244-1251, IEEE.

Mansikkaniemi, A., "Acoustic Model and Language Model Adaptation for a Mobile Dictation Service", Aalto University Master's Thesis, Feb. 3, 2010, Aalto University.

\* cited by examiner

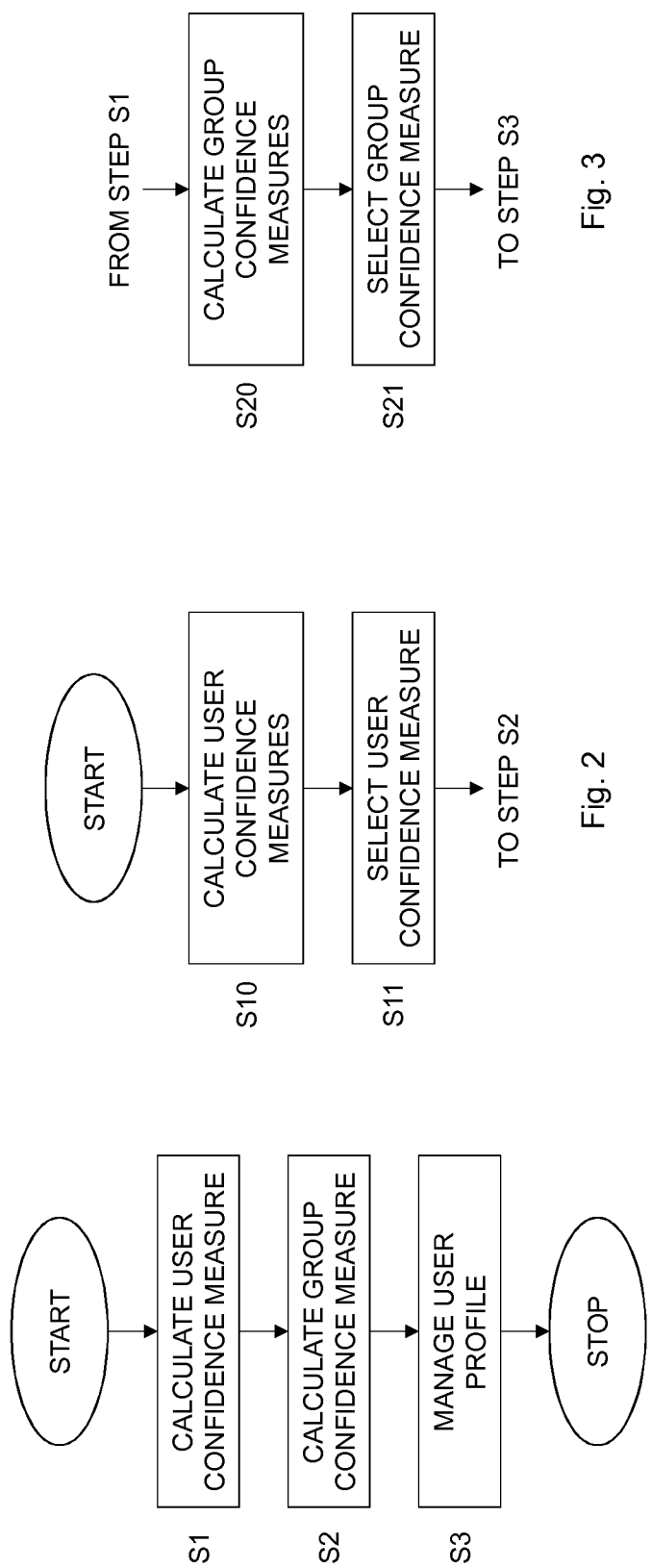

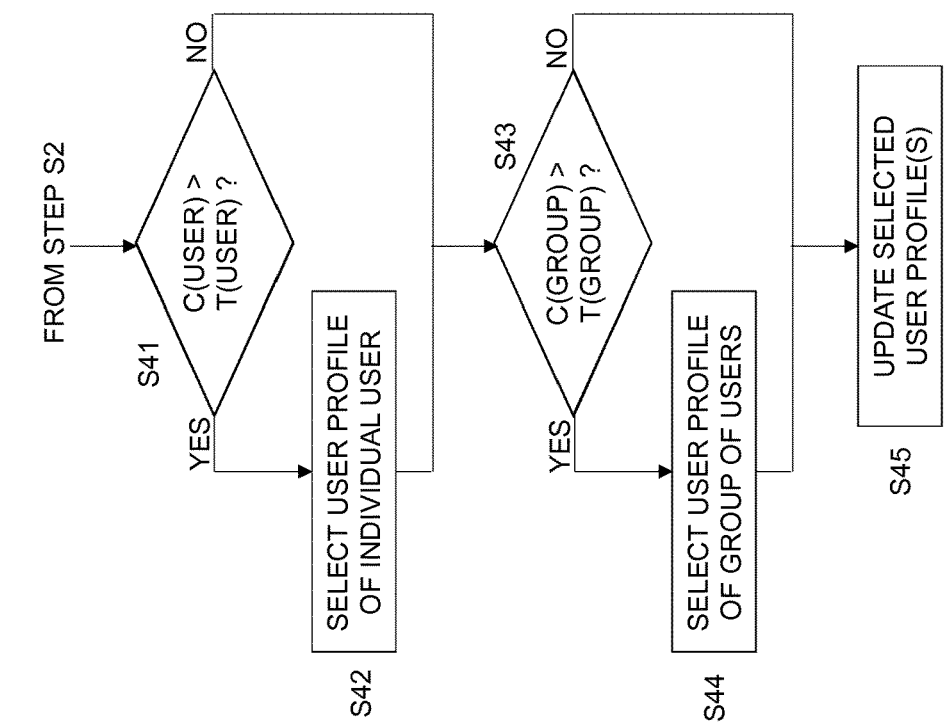
Fig. 8
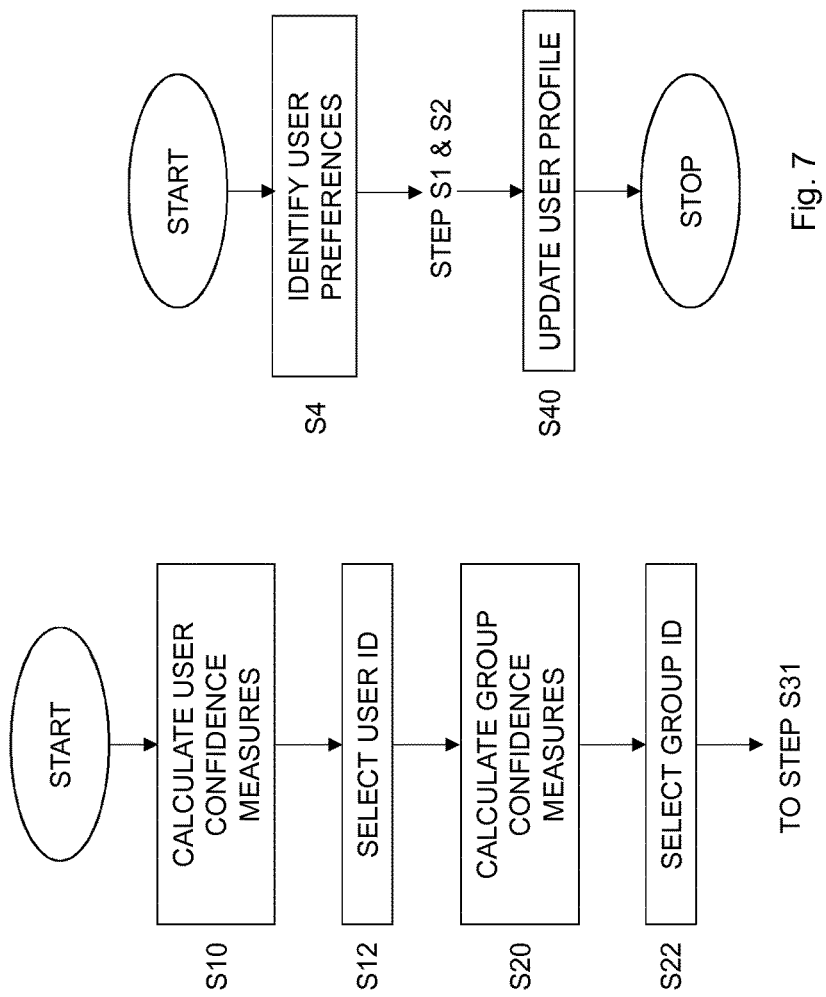
Fig. 7
Fig. 6

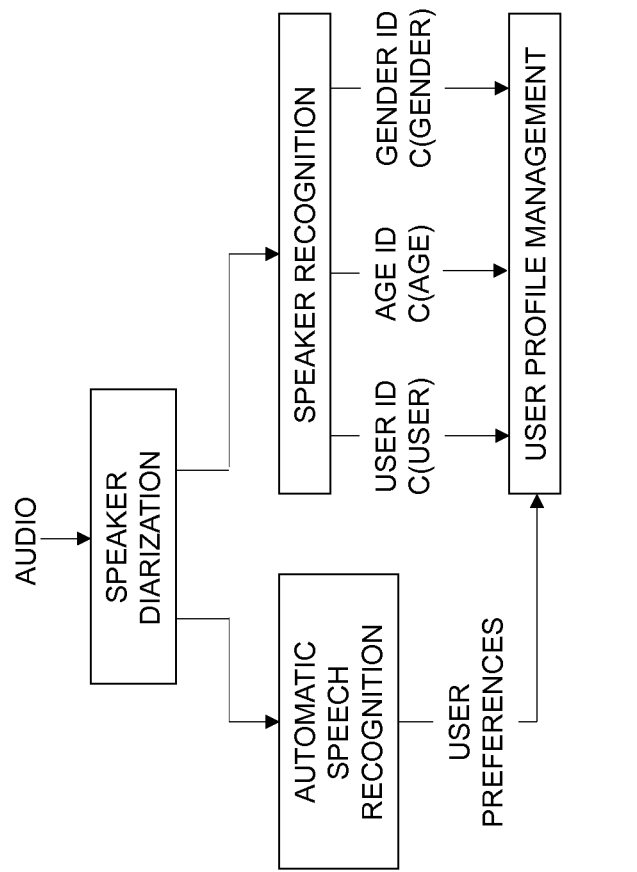
Fig. 10
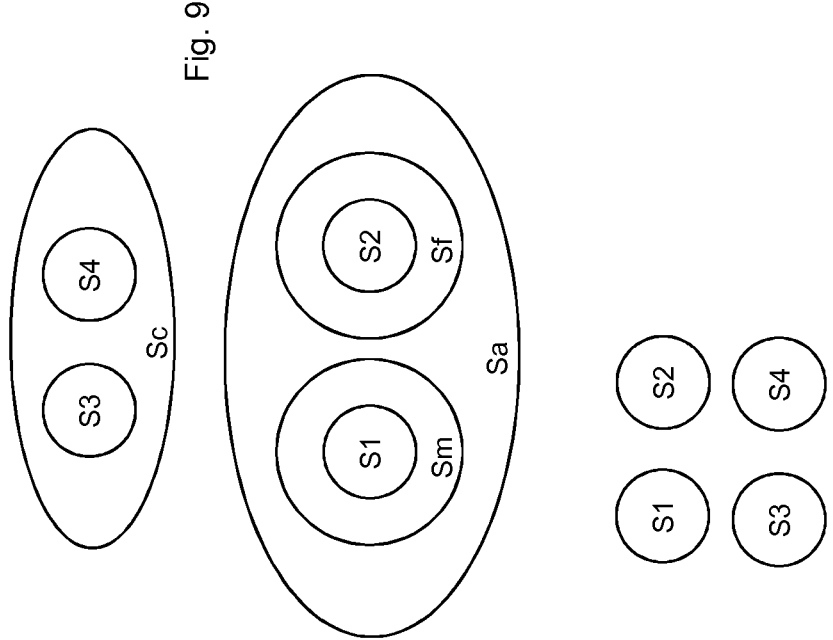
Fig. 9
Fig. 18

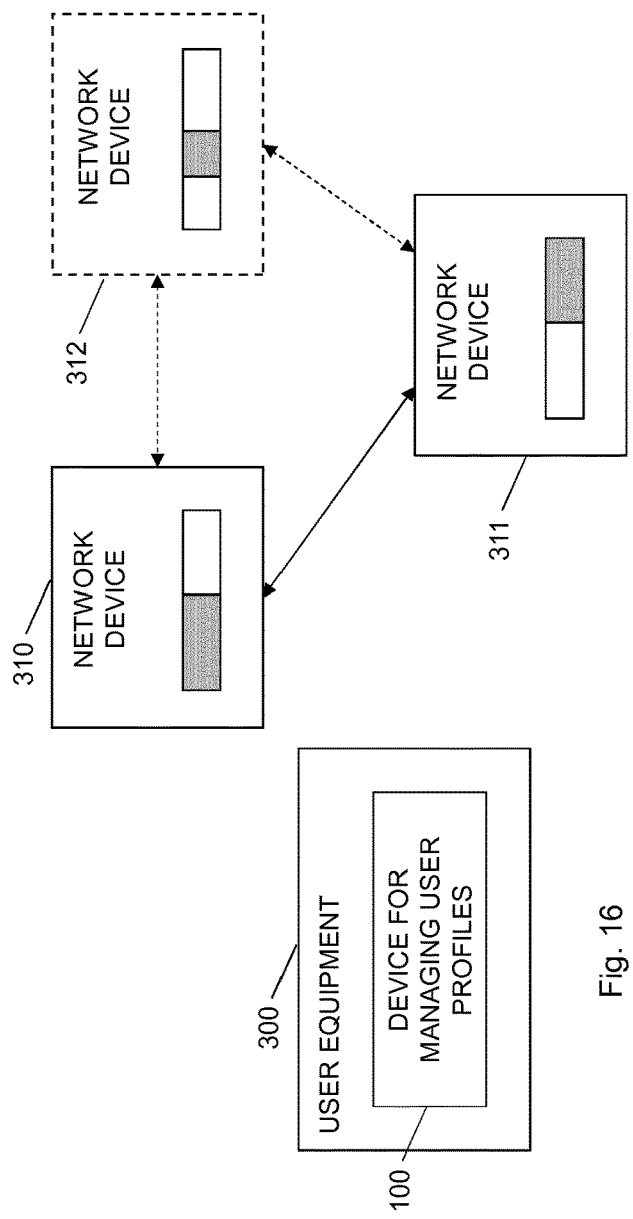
Fig. 17
Fig. 16
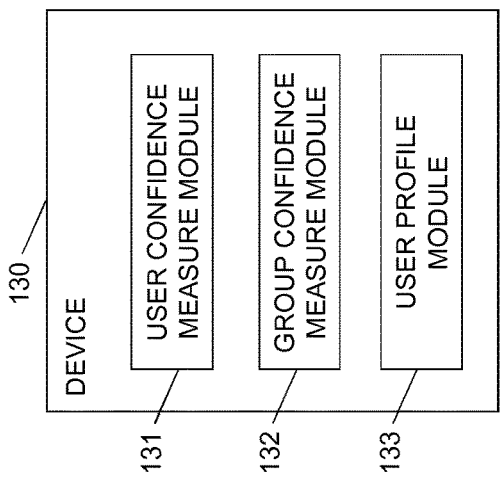
Fig. 15

VOICE-CONTROLLED MANAGEMENT OF USER PROFILES

TECHNICAL FIELD

The present embodiments generally relate to managing user profiles, and in particular to voice-controlled management of user profiles.

BACKGROUND

In the evolution of interaction between user equipment and home users towards voice-controlled user interfaces two types of systems are the main drivers. One is to understand what is being said. This is achieved by means of automatic speech recognition (ASR) and sub-sequent natural language processing (NLP) and natural language understanding (NLU) that enable fast voice control and search. The other is to understand who said it, which is achieved by means of speaker recognition (SR).

Extending user equipment, such as set-top boxes, with SR capabilities has two main advantages. The first one is using voice biometrics as an alternative and/or additional security layer to limit access to information and/or services to authorized users identified by means of SR. The second one is using the users' voices for intelligent profiling, i.e., user profile management. For these reasons, a robust SR optimized for the acoustic environment and voices of the family members is highly desirable.

The challenge with the SR technology in the home context and environment is that quite often the voices of different family members are close. As a result, the SR will be confused and make a wrong decision about the voice identity.

U.S. Pat. No. 9,363,155 discloses a non-intrusive user identification to provide personalized media content. Using one or more sensors, a user or a combination of users may be identified. If the user or combination of users is known, user information may be retrieved and rules may be applied for providing content personalized to the identified person or group of people. User behavior may be monitored and changes in the audience composition may be monitored so that personalized content may be adjusted accordingly.

There is still a need for voice-controlled management of user profiles suitable for usage in a home environment.

SUMMARY

It is a general objective to provide a voice-controlled management of user profiles suitable for usage in a home environment.

This and other objectives are met by embodiments as disclosed herein.

An aspect of the embodiments relates to a method of managing user profiles. The method comprises calculating, for an audio segment, a user confidence measure representing a probability that the audio segment comprises speech of a user. The method also comprises calculating, for the audio segment, a group confidence measure representing a probability that the audio segment comprises speech of a group of users. The method additionally comprises managing a user profile based on a comparison between the user confidence measure and a user confidence threshold and between the group confidence measure and a group confidence threshold.

Another aspect of the embodiments relates to a device for managing user profiles. The device is configured to calculate, for an audio segment, a user confidence measure representing a probability that the audio segment comprises speech of a user. The device is also configured to calculate, for the audio segment, a group confidence measure representing a probability that the audio segment comprises speech of a group of users. The device is further configured to manage a user profile based on a comparison between the user confidence measure and a user confidence threshold and between the group confidence measure and a group confidence threshold.

A further aspect of the embodiments relates to a device for managing user profiles according to an embodiment. The device comprises a user confidence measure module for calculating, for an audio segment, a user confidence measure representing a probability that the audio segment comprises speech of a user. The device also comprises a group confidence measure module for calculating, for the audio segment, a group confidence measure representing a probability that the audio segment comprises speech of a group of users. The device further comprises a user profile module for managing a user profile based on a comparison between the user confidence measure and a user confidence threshold and between the group confidence measure and a group confidence threshold.

Yet another aspect of the embodiments relates to a computer program comprising instructions, which when executed by at least one processor, cause the at least one processor to calculate, for an audio segment, a user confidence measure representing a probability that the audio segment comprises speech of a user. The at least one processor is also caused to calculate, for the audio segment, a group confidence measure representing a probability that the audio segment comprises speech of a group of users. The at least one processor is further caused to manage a user profile based on a comparison between the user confidence measure and a user confidence threshold and between the group confidence measure and a group confidence threshold.

A related aspect of the embodiments defines a carrier comprising a computer program according to above. The carrier is one of an electronic signal, an optical signal, an electromagnetic signal, a magnetic signal, an electric signal, a radio signal, a microwave signal, or a computer-readable storage medium.

The embodiments achieve an efficient voice-controlled user profile management suitable for home environment, in which voices from other family members may a challenge to reliably recognize the identity of a speaker. The embodiments utilize a layered approach by utilizing group of users as fallback when the identity of a given speaker cannot accurately be determined. This layered approach enables a relevant and accurate management of user profiles.

BRIEF DESCRIPTION OF THE DRAWINGS

The embodiments, together with further objects and advantages thereof, may best be understood by making reference to the following description taken together with the accompanying drawings, in which:

FIG. 1 is a flow chart illustrating a method of managing user profiles according to an embodiment;

FIG. 2 is a flow chart illustrating an embodiment of calculating user confidence measure;

FIG. 3 is a flow chart illustrating an embodiment of calculating group confidence measure;

FIG. 6 is a flow chart illustrating an embodiment of calculating user and group confidence measures;

FIG. 7 is a flow chart illustrating an embodiment of managing user profile;

FIG. 8 is a flow chart illustrating an embodiment of updating user profile;

FIG. 9 schematically illustrates a layered configuration into users and groups in the context of speech recognition;

FIG. 10 schematically illustrates an embodiment of managing user profiles;

FIG. 15 is a schematic block diagram of a device for managing user profiles according to yet another embodiment;

FIG. 16 is a schematic block diagram illustrating a user equipment according to an embodiment;

FIG. 17 schematically illustrates a distributed implementation among multiple network devices; and FIG. 18 schematically illustrates a configuration of users in the context of speech recognition according to prior art.

DETAILED DESCRIPTION

Figure 5:
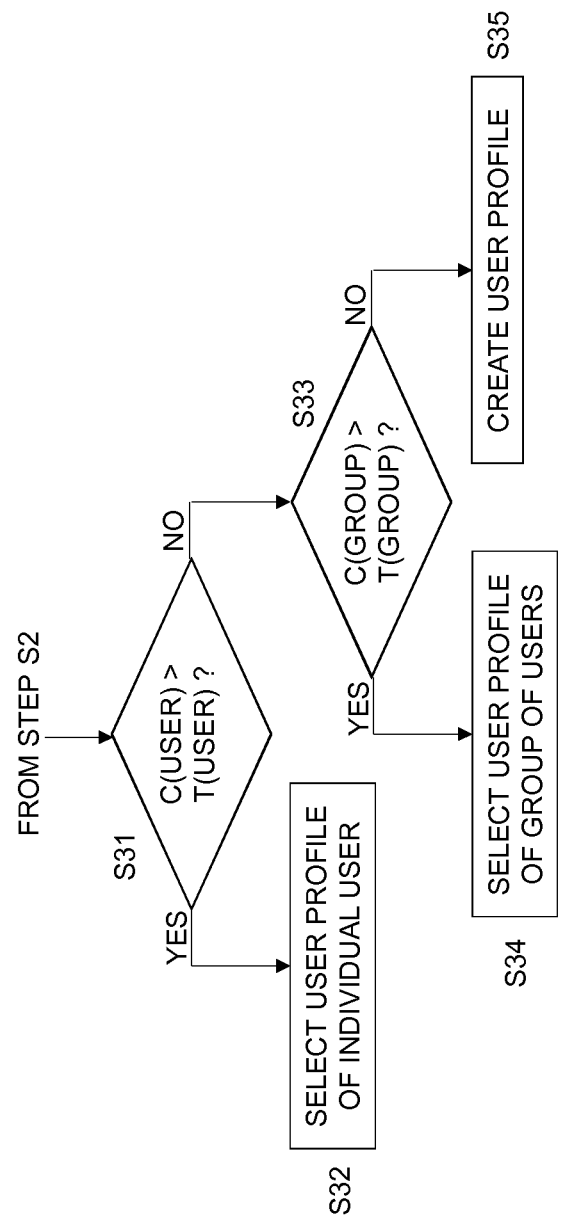
FIG. 5 is a flow chart illustrating an embodiment of selecting user profile.

The present embodiments generally relate to managing user profiles, and in particular to voice-controlled management of user profiles.

Speaker recognition (SR) implemented in user equipment can be used in user authentication to provide security by restricting information, settings. etc. to an authorized user. SR additionally enables intelligent profiling by updating profiles and settings of individual users based on user preferences in an automatic way. For instance, a user's preference with regard to movie genre, music, etc. as selected through voice control can be used to update the user profile of the particular user recognized by SR.

A potential problem with implementing SR in user equipment, such as set-top boxes, implemented in a home environment with multiple family members is that quite often the voices of different family members could be close when a given user is about to use voice-control to operate the user equipment. As a result of this particular audio environment, the SR may be confused and may make wrong or unreliable decisions with regard to the identity of the speaker. This may then have the result of incorrectly updating another user's user profile. In such a situation, the user profile will not correctly reflect the preferences of the correct family member, which will be annoying and lower the user experience.

U.S. Pat. No. 9,363,155 discloses that if the SR algorithm is not able to determine the identity of a speaker, the user equipment will automatically selected a default, generic child profile. Such a solution has similar problems with regard to low user experience as mentioned above since the user is then presented with options according to the generic child profile rather than according to his/her own profile. The options, such as movie titles, presented according to the generic child profile are most likely not the options that the particular user would prefer and that would be presented if the SR algorithm correctly recognized the user.

The present embodiments enable intelligent user profiling and user profile management in a voice-controlled context despite uncertainties in SR decisions. The present embodiments achieve this by utilizing a layered SR structure that complements speaker models for individual speakers or users with speaker models for groups of users. Thus, even if the SR algorithm cannot recognize a speaker's identity with sufficient confidence the SR algorithm may reliably identify a correct group identity for the speaker. For instance, the SR algorithm could determine the gender of the speaker, i.e., male or female, and/or the age group of the speaker, e.g., child or adult. This in turn implies that even if the correct speaker cannot be reliably identified and thereby his/her user profile cannot be selected and/or updated, it is still possible to select and/or update a group profile that the user belongs to. Such a purposeful selection of group identity and group profile as a fallback when the SR algorithm fails to reliably identify a speaker achieves a higher user experience as compared to the using a generic child profile per default.

FIG. 1 is a flow chart illustrating a method managing user profiles according to an embodiment. The method comprises calculating, in step S1 and for audio segment, a user confidence measure representing a probability that the audio segment comprises speech of a user. Step S2 correspondingly comprises calculating, for the audio segment, a group confidence measure representing a probability that the audio segment comprises speech of a group of users. Steps S1 and S2 can be performed in any order, i.e., step S1 prior to or after step S2, or at least partly in parallel. A following step S3 comprises managing a user profile based on a comparison between the user confidence measure and a user confidence threshold and between the group confidence measure and a group confidence measure.

Hence, the method as shown in FIG. 1 comprises calculating not only a user confidence measure that represents a probability that an audio segment comprises speech of a particular user or speaker. The method also comprises calculating a group confidence measure that represents a probability that the audio segment comprises speech of a particular group of users. The calculated confidence measures are then compared to respective confidence thresholds and the comparison is used to control management of a user profile.

The user confidence measure reflects the reliability of recognizing the audio segment as comprising speech of a particular speaker. For instance, the user confidence measure represents the probability that the audio segment comprises speech of user or speaker 2. The group of users can potentially, in clear contrast, to the particular user or speaker contain different users or speakers. However, the group of users typically has common voice characteristics. Thus, it is possible to classify or group users or speakers into different groups of users based on the voice characteristics of the users. For instance, a first group of users could include users or speakers 1 and 2 having common voice characteristics, whereas a second group of users could include users or speakers 3 and 4, who have common voice characteristics that are different from the voice characteristics of users or speakers 1 and 2.

For instance, step S2 of FIG. 1 could comprise calculating, for the audio segment, a gender group confidence measure representing a probability that the audio segment comprises speech of a male user or of a female user.

A SR algorithm, module or engine can, for instance, determine fundamental frequency (pitch) from audio segments comprising speech. The pitch models well the differences in the vocal-tract geometry between male and female speakers. For example, a speaker with pitch less than 160 Hz is typically a male speaker, and a pitch above this value is typically a female speaker.

For instance, assume a situation with a family consisting of four family members, a husband (speaker 1), a wife (speaker 2) and their two children (speaker 3 and 4). In this case there is therefore a set of four potential users, i.e., the four family members. In such a case, step S1 of FIG. 1 calculates at least one user confidence measure representing a probability that the audio segment comprises speech of one of the family members.

This means that in this embodiment of FIG. 1 a user confidence measure is calculated in step S1 to indicate the probability that the audio segment comprises speech of a particular user, such as one of users or speakers 1 to 4 mentioned above. The embodiment also comprises calculating a gender group confidence measure representing a probability that the audio segment comprises speech of a male user or speaker or of a female user or speaker.

If the user confidence measure represents a sufficiently high probability the SR algorithm is able to reliably recognize the speaker in the given audio segment, such as speaker 2. Correspondingly, if the gender group confidence measure represents a sufficiently high probability the SR algorithm is able to reliably recognize the gender of the speaker, such as female speaker. In such a particular situation the SR algorithm could reliably recognize both the gender of the speaker and the particular identity of the speaker.

Generally, it is easier for a SR algorithm to determine the gender of the speaker as compared to identifying the particular speaker. This means that in a home environment with background noise from other family members or persons it is not unlikely that the SR algorithm fails to reliably determine the identity of the speaker but still manages to reliably determine the gender of the speaker. In such a situation, the user confidence measure represents a low probability that the audio segment comprises speech of a particular speaker, whereas the gender group confidence measure represents a sufficiently high probability that the SR algorithm is able to recognize the gender of the speaker.

The management of the user profile in step S3 is then performed based on the probabilities or reliabilities of the two confidence measures. Thus, different forms of user profile managements are preferably performed in step S3 for the above two described different cases.

In another embodiment, step S2 of FIG. 1 comprises calculating, for the audio segment, an age group confidence measure representing a probability that the audio segment comprises speech of an adult user or of a child user.

A SR algorithm can, for instance, determine feature vectors, such as Mel-frequency cepstral coefficients (MFCCs), and fundamental frequency (pitch) from audio segments comprising speech. The feature vectors, e.g., MFCCs, and the pitch can model well the differences in the vocal-tract geometry between adult and child speakers. For example, child voices have both higher fundamental frequencies (pitch) and formant frequencies, which are captured by the MFCCs, as compared to adults.

This means that in this embodiment of FIG. 1 a user confidence measure is calculated in step S1 to indicate the probability that the audio segment comprises speech of a particular user, such as one of users or speakers 1 to 4 mentioned above. The embodiment also comprises calculating an age group confidence measure representing a probability that the audio segment comprises speech of an adult user or speaker or of a child user or speaker.

If the user confidence measure represents a sufficiently high probability the SR algorithm is able to reliably recognize the speaker in the given audio segment, such as speaker 2. Correspondingly, if the age group confidence measure represents a sufficiently high probability the SR algorithm is able to reliably recognize the age of the speaker, such as an adult speaker. In such a particular situation the SR algorithm could reliably recognize both the age of the speaker and the particular identity of the speaker.

Generally, it is easier for a SR algorithm to determine the age of the speaker as compared to identifying the particular speaker. This means that in a home environment with background noise from other family members or persons it is not unlikely that the SR algorithm fails to reliably identify the identity of the speaker but still manages to reliably determine the age of the speaker. In such a situation, the user confidence measure represents a low probability that the audio segment comprises speech of a particular speaker, whereas the age group confidence measure represents a sufficiently high probability that the SR algorithm is able to recognize the age of the speaker.

The management of the user profile in step S3 is then performed based on the probabilities or reliabilities of the two confidence measures. Thus, different forms of user profile managements are preferably performed in step S3 for the two different cases described above.

In another embodiment, step S2 comprises calculating both a gender group confidence measure representing a probability that the audio segment comprises speech of a male user or of a female user and an age group confidence measure representing a probability that the audio segment comprises speech of an adult user or of a child user.

In a more general embodiment, step S2 the comprises calculating, for the audio segment, a first group confidence measure representing a probability that the audio segment comprises speech of a group of users of a first set of groups of users and a second group confidence measure representing a probability that the audio segment comprises speech of a group of users of a second set of groups of users. In this embodiment, step S3 comprises managing the user profile based on a comparison between the user confidence measure and the user confidence threshold, between the first group confidence measure and a first group confidence threshold and between the second group confidence measure and a second group confidence threshold.

More information of recognizing and classifying age and gender is disclosed in Bocklet et al., Age and gender recognition for telephone applications based on GMM supervectors and support vector machines, 2008 IEEE International Conference on Acoustics, Speech and Signal Processing, 31 Mar.-4 Apr. 2008, Las Vegas, Nev., USA, pages 1605-1608.

FIG. 2 is a flow chart illustrating an embodiment of step S1 in FIG. 1. This embodiment comprises calculating, in step S10 and for the audio segment and for each user of a set of users, a respective user confidence measure representing a respective probability that the audio segment comprises speech of the user. The embodiment also comprises selecting, in step S11, a user confidence measure representing a highest probability among the respective calculated user confidence measures.

Hence, in this embodiment there is a set of available users, such as the family members of a user equipment. In such a case, a respective user confidence measure is calculated for each such user in the set of users. The user confidence measure that represents the highest probability that the audio segment comprises speech of a given user from the set of users is then selected.

For instance, assume a set of four users or family members as mentioned in the foregoing. In such a case, four user confidence measures are preferably calculated in step S10, one such user confidence measure for each of the four users. Step S11 then selects one of these four user confidence measures and in more detail selects the user confidence measure that represents the highest probability with regard to that the audio segment comprises speech of that particular user.

In a typical implementation the SR algorithm has access to a respective speaker model, such as a Gaussian Mixture Model (GMM), for each user in the set of users, e.g., $S_1$, $S_2$, $S_3$, $S_4$. In such a case, the SR algorithm uses the speaker models for identifying the speaker of the audio segment. Each such speaker model outputs a respective user confidence measure $C_1$, $C_2$, $C_3$, $C_4$ representing a probability that the audio segment comprises speech of the speaker, the voice of which the given speaker model represents or models. In a typical case, a confidence measure can range from a value of zero representing minimum probability up to one representing maximum probability that the audio segment comprises speech of a user. This range should merely be seen as an illustrative, but non-limiting, example of values for the confidence measures. For instance, in other cases, the value zero could represent maximum probability whereas the value one represent minimum probability. Another example could be to have unbounded confidence measures, such as minimum probability is represented by $-\infty$ (negative infinity) and 0 could represent maximum probability. Or more generally, the value X representing minimum probability (or maximum probability) and the value Y representing maximum probability (or minimum probability), wherein X<Y.

In a typical case the sum of the user confidence measures is equal to the value representing maximum probability, such as one, e.g., $\Sigma_{i=1}^{4} C_i = 1$. For instance, assume that the SR algorithm calculates the following user confidence measures $C_1=0.38$, $C_2=0.43$, $C_3=0.11$ and $C_4=0.08$ in a first example and the following user confidence measures $C_1=0.08$, $C_2=0.73$, $C_3=0.11$ and $C_4=0.08$ in a second example. In both these illustrative examples, the user confidence value for the second user of the set of users, i.e., $C_2$, represents the highest probability and is thereby selected in step S11.

Any measure or parameter that represents a confidence, reliability or uncertainty of the SR to correctly identify the identity of a speaker or the group affiliation of a speaker can be used as confidence measure according to the embodiments. Non-limiting examples include so-called likelihood scores and posterior probabilities.

The method then continues to step S2 in FIG. 1.

FIG. 3 is a flow chart illustrating an embodiment of step S2 in FIG. 1. The method continues from step S1 in FIG. 1 or from step S11 in FIG. 2. This embodiment comprises calculating, in step S20 and for the audio segment and for each group of users of a set of groups of users, a respective group confidence measure representing a respective probability that the audio segment comprises speech of the group of user. The embodiment also comprises selecting, in step S21, a group confidence measure representing a highest probability among the respective calculated group confidence measures.

Hence, in this embodiment there is a set of available groups of users, such as adult users vs. child users and/or male users vs. female users. In such a case, a respective group confidence measure is calculated for each such group of users of the set of groups of users. The group confidence measure that represents the highest probability that the audio segment comprises speech of a given group of users from the set of groups of users is then selected.

For instance, assume a set of two groups of users corresponding to adult users vs. child users or male users vs. female users. In such a case, two group confidence measures are preferably calculated in step S20, one such group confidence measure for each of the two groups of users. Alternatively, there could be two different sets of groups of users as mentioned above, i.e., a first set of adult vs. child users and a second set of male vs. female users. In such a case, four group confidence measures are preferably calculated in step S20.

Step S21 then selects one of these two group confidence measures or one group confidence measure per set of groups of users, and in more detail selects the group confidence measure that represents the highest probability with regard to that the audio segment comprises speech of that particular group of users or selects, for each set of groups of users, the group confidence measure that represents the highest probability with regard to that the audio segment comprises speech of that particular group of users.

In a typical implementation the SR algorithm thereby also has access to a respective speaker model, such as GMM, for each group of users in the set(s) of groups of users, e.g., $S_a$ for adult users, $S_c$ for child users, $S_m$ for male users and $S_f$ for female users. In a typical case, the sum of the group confidence measures for each set of groups of identifiers is equal to the value representing the maximum probability, such as one, e.g., $C_a+C_c=1$ and $C_m+C_f=1$.

In line with the above mentioned examples, assume that the SR algorithm calculates the following group confidence measures $C_a=0.95$, $C_c=0.05$; $C_m=0.02$, $C_f=0.98$ in both examples. In these illustrative examples, the group confidence value for the adult group of users, i.e., $C_a$, and the group confidence value for the female group of users, i.e., $C_f$, represent the highest probability and are thereby selected in step S21.

The method then continues to step S3 in FIG. 1.

In both examples above the selected confidence measures are thereby $C_2$, $C_a$; $C_2$, $C_f$ or $C_2$, $C_a$ and $C_f$ depending on whether one or two sets of groups of users are available for the SR algorithm in steps S20 and S21.

The values of $C_a$, $C_f$ are very high, 0.95 and 0.98, respectively, in both examples indicating that the audio segment with very high probability comprises speech of an adult female speaker. In the first example, the highest user confidence measure was only 0.43. Accordingly, the reliability of recognizing the identity of the speaker in the audio segment is quite low in this first example.

Accordingly, the management of the user profile in step S3 is preferably based on this insight, i.e., that the speaker is an adult female speaker but that the identity of the particular speaker is regarded as unknown or not sufficient reliable.

This is contrast to the second example in which also the user confidence measure is quite high, i.e., 0.73. The management of the user profile in step S3 is preferably based on that the speaker is an adult female speaker and with a sufficiently reliable identity.

Figure 4:
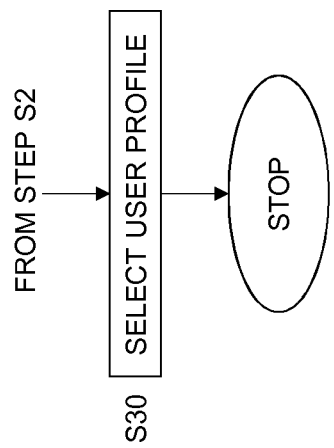
FIG. 4 is a flow chart illustrating an embodiment of managing user profile.

FIG. 4 is a flow chart illustrating an embodiment of step S3 in FIG. 1. The method continues from step S2 in FIG. 1 or from step S21 in FIG. 3. Step S30 of this embodiment comprises selecting a user profile based on the comparison between the user confidence measure and the user confidence threshold and between the group confidence measure and the group confidence threshold.

Thus, the comparison between confidence measures and respective confidence thresholds is used in this embodiment of step S3 to select a user profile.

For instance, in line with the first example above step S30 could comprise selecting a user profile for a female adult user, selecting a user profile for a female user, selecting a user profile for an adult user or selecting a first user profile for a female user and a second user profile for an adult user.

Correspondingly, in the second example above, step S30 could comprise selecting a user profile for user no. 2, selecting the user profile for user no. 2 and in addition selecting a user profile for a female adult user, a female user or an adult user or in addition selecting a first user profile for a female user and a second user profile for an adult user.

FIG. 5 is a flow chart illustrating a particular embodiment of step S30 in FIG. 4. The method continues from step S2 in FIG. 1 or from step 21 in FIG. 3. The optional step S31 compares the user confidence measure (C(USER)) with the user confidence threshold (T(USER)). If a probability represented by the user confidence measure is higher than a threshold probability represented by the user confidence threshold the method continues to step S32. This step S32 comprises selecting a user profile of an individual user.

However, if the probability represented by the user confidence measure is not higher than the threshold probability represented by the user confidence threshold the method instead continues to the optional step S33. This optional step S33 compares the group confidence measure (C(GROUP)) with the group confidence threshold (T(GROUP). If a probability represented by the group confidence measure is higher than a threshold probability represented by the group confidence measure the method continues to step S34. This step S34 comprises selecting a user profile of a group of users.

Thus, in this particular embodiment a single user profile is selected based on the comparison of the confidence measures and the respective confidence thresholds, i.e., a user profile of an identified user in step S32 or a user profile of a group of users in step S34.

In another embodiment, steps S31+S31 and steps S33+S34 are performed in parallel to thereby select zero, one or two user profiles (for the case with a single set of groups of users) based on the comparisons in steps S31 and S33, i.e., selecting no user profile, selecting a user profile of an individual user, selecting a user profile of a group of users or selecting a user profile of an individual user and a user profile of a group of users.

In the case of multiple, i.e., at least two, sets of groups of identifiers steps corresponding to steps S33 and S34 could be performed for the second and further set of groups of users if the comparison in step S33 indicates that the probability represented by a first group confidence measure is not higher than the threshold probability represented by a first group confidence threshold, or in parallel with steps S33+S34 or in parallel with steps S31+S32 and S33+S34.

However, if the probability represented by the user and group confidence measures are not higher than the respective threshold probabilities represented by the user and group confidence thresholds the method instead continues to the optional step S35. In this case, the SR algorithm cannot reliably identify either the identity of the speaker or a group of users to which the speaker belongs. In this case, a new user profile is created in step S35.

In an embodiment, the selection of user profile can be performed according to the following pseudo-code:

```
IF C(USER) > T(USER)
    select the user profile (P(USER)) that
    corresponds to the most likely speaker
ELSE IF C(AGE) > T(AGE)
    select the user profile (P(AGE)) that
    corresponds to the most likely age group
ELSE IF C(GENDER) > T(GENDER)
    select the user profile (P(GENDER)) that
    corresponds to the most likely gender group
END
```

This means that when the SR algorithm is certain about speaker identity a speaker-specific user profile is selected. If the SR algorithm is not certain about the speaker identity but certain about the age group an adult or child user profile is selected, and finally if the SR algorithm is certain about the gender of the speaker a gender profile is selected.

In other embodiments, any of the following pseudo-codes are instead used.

```
IF C(USER) > T(USER)
    select the user profile (P(USER)) that
    corresponds to the most likely speaker
ELSE IF C(AGE) > T(AGE)
    select the user profile (P(AGE)) that
    corresponds to the most likely age group
ELSE IF C(GENDER) > T(GENDER)
    select the user profile (P(GENDER)) that
    corresponds to the most likely gender group
ELSE
    create new user profile
END
IF C(USER) > T(USER)
    select the user profile (P(USER)) that
    corresponds to the most likely speaker
ELSE IF C(GENDER) > T(GENDER)
    select the user profile (P(GENDER)) that
    corresponds to the most likely gender group
ELSE IF C(AGE) > T(AGE)
    select the user profile (P(AGE)) that
    corresponds to the most likely age group
END
IF C(USER) > T(USER)
    select the user profile (P(USER)) that
    corresponds to the most likely speaker
ELSE IF C(GENDER) > T(GENDER)
    select the user profile (P(GENDER)) that
    corresponds to the most likely gender group
ELSE IF C(AGE) > T(AGE)
    select the user profile (P(AGE)) that
    corresponds to the most likely age group
ELSE
    create new user profile
END
```

Note that the confidence thresholds used in the embodiments may be same or different. For instance, T(USER)=T(AGE)=T(GENDER); T(USER)≠T(AGE)=T(GENDER), such as T(USER)<T(AGE)=T(GENDER); T(USER)≠T(AGE)≠T(GENDER), such as T(USER)<T(AGE)<T(GENDER) or T(USER)<T(GENDER)<T(AGE).

Illustrative, but non-limiting, examples of values for the above mentioned confidence thresholds could be T(USER)=0.5, T(AGE)=0.8 and T(GENDER)=0.9 if 0 corresponds to minimum probability and 1 corresponds to maximum probability.

In a particular embodiment, the method of FIG. 1 is implemented as shown in FIG. 6. This particular embodiment comprises calculating, in step S10 and for the audio segment and for each user having a respective user identifier of a set of users, a respective user confidence measure representing a respective probability that the audio segment comprises speech of the user. The embodiment also comprises selecting, in step S12, a user identifier of a user of the set of users having a user confidence measure representing a highest probability among the respective user confidence measures. Step S20 comprises calculating, for the audio segment and for each group of users having a respective group identifier of a set of groups of users, a respective group confidence measure representing a respective probability that the audio segment comprises speech of the group of users. A following step S22 comprises selecting a group identifier of a group of users of the set of groups of users having a group confidence measure representing a highest probability among the respective group confidence measures. The method then continues to FIG. 5. In this particular embodiment step S32 comprises selecting, based on the selected user identifier, a user profile of an individual user if a probability represented by the user confidence measure is higher than a threshold probability represented by the user confidence threshold. Step S34 comprises selecting, based on the group identifier, a user profile of a group of users if the probability represented by the user confidence measure is not higher than the threshold probability represented by the user confidence threshold but a probability represented by the group confidence measure is higher than a threshold probability represented by the group confidence threshold.

This particular embodiment of selecting user and group identifiers could also be applied to the case of selecting more than one user profile, such as selecting one user profile of an individual user and selecting at least one user profile of a group of users.

FIG. 7 is a flow chart illustrating another embodiment of managing user profile. In this embodiment, the method comprises step S4, which comprises identifying user preferences by analyzing the audio segment. The method then continues to steps S1 and S2. In this embodiment step S3 is performed according to step S40, which comprises updating the user profile with the user preferences based on the comparison between the user confidence measure and the user confidence threshold and between the group confidence measure and the group confidence threshold.

In an embodiment, identifying the user preferences in step S4 is performed by automatic speech recognition (ASR) to identify the preferences among the words spoken by the speaker of the audio segment. An ASR algorithm, module or engine could thereby analyze the speech in the audio segment to identify any user preferences therein.

Non-limiting, but illustrative, examples of user preferences include a genre of a media, such as genre or music or video; a name of a singer or band; a name of an actor or actress; a name of a director; a name of a sport team or athlete; a web site address; a user equipment setting; etc.

The identified user preferences are then used in step S40 to update a user profile.

For instance, assume a simple example where a user profile comprises movie genre and that the genre could be either comedy, action, drama, thriller or sci-fi. A newly created user profile would probably set equal weights to these alternatives, i.e., P=[comedy, action, dram, thriller, sci-fi]=[0.2, 0.2, 0.2, 0.2, 0.2]. However, as a given user uses voice-control to select movies the ASR algorithm identifies the genre of the movie, such as based on a selected title or based on a genre classification associated with a selected movie, and the SR algorithm identifies the identity of the speaker to update his/her user profile. If the user is mainly interested in sci-fi and action movies the updated user profile may over time instead be P=[0.05, 0.4, 0.1, 0.05, 0.4].

The two embodiments of managing user profiles may advantageously be combined, i.e., the comparison of confidence measures with confidence thresholds are used in order to select and update user profile(s). Such an embodiment is illustrated in FIG. 8. The method continues from step S2 in FIG. 1 or from step S21 in FIG. 3 or step S22 in FIG. 6. A next optional step S41 corresponds to step S31 and is not further described. Step S42 corresponds to step S32 in FIG. 5 and, thus, comprises selecting a user profile of an individual user if a probability represented by the user confidence measure is higher than a threshold probability represented by the user confidence threshold.

The optional step S43 corresponds to step S33 in FIG. 5 and is not further described. Step S44 corresponds to step S34 in FIG. 5 and, thus, comprises selecting a group profile of a group of users if a probability represented by the group confidence measure is higher than a threshold probability represented by the group confidence threshold.

The method then continues to step S45, which comprises updating the selected user profile(s) with the user preferences.

This step S45 could, thus, update zero, one, two or more (in the case of multiple sets of groups of users) user profiles depending on the outcome of the comparisons in optional steps S41 and S43.

The selective updating of user profiles based on the comparison between confidence measures and confidence thresholds enables relevant and accurate user profiles that correctly reflect the preferences of the users. The user profiles of individual users are updated to reflect the preferences of respective single users, whereas user profiles of groups of users may be updated based on preferences or multiple users belonging to an identified group of users. This levelled approach implies that a user's own user profile most correctly reflects his/her preferences, whereas a user profile of a group to which the user belongs still is more relevant for the particular user as compared to a generic child profile.

The selective updating also implies that if the SR algorithm is able to correctly recognize both the identity of the speaker and the group(s) of users to which the speaker belongs preferably both the speaker's own user profile and the user profile(s) of the groups(s) of users are updated based on the identified user preferences. Hence, in this situation the speaker's user preferences not only updates his/her own user profile but also the user profile(s) of group(s) of users.

The selective updating furthermore effectively prevents user profile update if the identity of the user and/or the group identity are not reliably recognized. This reduces the risk of, for instance, updating a user profile of speaker 2 based on user preferences of speaker 1.

Updating of user profiles can be implemented according to various embodiments. For instance, user profiles could be recursively updated each time the user or group of user is selected, such as $$P_{n+1} = \frac{n}{n+1}P_n + \frac{1}{n+1}X_{n+1},$$

where $X_{n+1}$ represents the current user preferences and $P_n$ is the past or latest user profile for the user or group of users. This illustrative example corresponds to a recursive mean calculation and is preferably applied to all elements of the user profile and user preferences. These elements correspond to the movie genres comedy, action, drama, thriller or sci-fi in the above described example.

FIG. 9 schematically illustrates a layered configuration into users and groups of users in the context of speech recognition. This particular example corresponds to the previously described family with a husband, a wife and two children.

The group of adult users, represented by the speaker model $S_a$ for the adult group, comprises both male users, represented by its speaker model $S_m$, and female users, represented by its speaker model $S_f$. The individual adult users, represented by the speaker models $S_1$ and $S_2$ for the husband and wife, then constitute "sub-sets" of the male and female groups. Correspondingly, the two children, represented by the speaker models $S_3$ and $S_4$, constitute a "sub-set" of the child group, represented by its speaker model $S_c$.

FIG. 18 illustrates the corresponding situation with speaker models for the family members $S_1$-$S_4$ according to the disclosure in U.S. Pat. No. 9,363,155 lacking any layered organization and groups of users.

FIG. 10 schematically illustrates an embodiment of managing user profiles. This embodiment illustrates an input audio stream that is subject to speaker diarization.

Speaker recognition, also referred to as voice recognition, is the identification of a speaker from characteristics of voices. Speaker recognition uses the acoustic features of speech, i.e., a so-called speaker model, that have been found to differ between individuals. The speaker model reflects both anatomy, e.g., size and shape of the vocal tract, and learned behavioral patterns, e.g., voice pitch, speaking style. A speaker recognition process is a pattern recognition process. The various technologies used to process and store voice prints include frequency estimation, hidden Markov models, Gaussian mixture models, pattern matching algorithms, neural networks, matrix representation, vector quantization and decision trees.

Generally, speaker diarization is the process of partitioning an input audio stream into homogenous audio segments and further grouping those segments based on their similarity. A homogenous audio segment is an audio segment comprising speech of a single speaker. Speaker diarization enhances the readability of an automatic speech transcription by structuring the audio stream into homogenous audio segments. Speaker diarization is a combination of speaker segmentation and speaker clustering. Speaker segmentation aims at finding speaker change points in an audio stream, whereas speaker clustering aims at grouping together audio segments on the basis of speaker characteristics.

In speaker diarization one of the most popular methods is to use a Gaussian mixture model (GMM) to model each of the speakers, and assign the corresponding audio frames for each speaker with the help of a hidden Markov model (HMM). There are two main kinds of clustering scenario. The first one is by far the most popular and is called Bottom-Up. The algorithm starts in splitting the full audio content in a succession of clusters and progressively tries to merge the redundant clusters in order to reach a situation where each cluster corresponds to a real speaker. The second clustering strategy is called Top-Down and starts with one single cluster for all the audio data and tries to split it iteratively until reaching a number of clusters equal to the number of speakers.

For instance, speech active segments from the incoming audio stream are detected by means of a voice activity detector (VAD). Next, a set of feature vectors modeling short-term frequency characteristics of the audio waveform are extracted from the speech active segments. One commonly used representation of such feature vectors is MFCCs, typically extracted every 10 ms. Changes of the statistics of the feature sets, belonging to the left or right side of a sliding window of size few seconds, are used to detect potential speaker change points in the middle of the sliding window.

Audio segments formed in the speaker change detection are initially clustered, e.g., by means of k-means clustering algorithm, to form an initial voice partitioning. With accumulation of more audio samples a GMM may be used to model the distribution of features for each individual voice. Once the GMMs for individual speakers are available, blind speaker diarization is not required and new feature vectors can be tested against each speaker model. The best matching speaker model is selected to determine the speaker identity.

More information of speaker diarization can be found in Jin et al., Speaker segmentation and clustering in meetings. In Proceedings of the 8th International Conference on Spoken Language Processing, Jeju Island, Korea, 2004.

The output of the speaker diarization are, thus, audio segments comprising speech of a single speaker. The audio segments are processed in a speaker recognition algorithm or device. According to the embodiments the speaker recognition not only tries to determine the identity of the speaker but also tries to determine group identity, i.e., to which group(s) of users the speaker belongs to.

As mentioned in the foregoing, the speaker recognition could use a GMM-based algorithm to model the distribution of feature vectors, such as MFCCs, and pitch to determine user and group identities and calculate corresponding confidence measures. More information of speaker recognition can be found in Reynolds and Rose, Robust text-independent speaker identification using Gaussian mixture speaker models, *IEEE Transactions on speech and audio processing*, 1995, 3(1): 72-83. Reynolds, Comparison of background normalization methods for text-independent speaker verification, Proceedings of the European Conference on Speech Communication and Technology, 1997, 2: 963-966 discloses a method of calculating confidence measures in the case decisions are made on likelihood scores. If the speaker recognition process instead calculates posterior probabilities and not likelihood there is no need to create likelihood ratios by normalization with another model since the posterior probability defines how confident the speaker recognition is, i.e., close to 1—very confident and close to 0—very uncertain.

The output of the speaker recognition is then a user or speaker identifier of the most likely speaker together with the user confidence measure for that user. The speaker recognition also outputs group identifier(s) and group confidence measure(s) represented by an age identifier, e.g., adult vs. child, and a gender identifier, e.g., male vs. female, and corresponding age and gender group confidence measures in FIG. 10.

The audio segments output from the speaker diarization are also input to an automatic speech recognition algorithm or device in order to analyze what is said by the speaker for the purpose of identifying any user preferences.

Automatic speech recognition uses an acoustic model (AM) and a language model (LM) in speech recognition.

The acoustic model represents the relationship between an audio signal and the phenomes or other linguistic units that make up the speech. An acoustic model is a statistical model that estimates the probability that a certain phoneme or sub-phoneme has been uttered in an audio segment. Non-limiting, but illustrative examples of such models include GMM, HMMs, neural networks with a softmax output layer, etc. Different methods are used for doing speaker adaptation of these models. Examples of such methods are vocal tract length normalization (VTLN), maximum a posteriori (MAP) adaptation of HMM/GMM parameters, maximum likelihood linear regression (MLLR) of Gaussian parameters and weighted speaker cluster approaches, which use an interpolated model to represent the current speaker.

A language model is a statistical model that estimates the probabilities of a word following a short sequence of words. These are called n-grams, where a 1-gram gives the probability of a word without taking into consideration the previous word before it. A 2-gram gives the probability of a word given the previous word before it, a 3-gram gives the probability of a word given the two previous words before it, etc. Language models are adapted to different contexts by compiling n-gram models on text material from the different contexts. To obtain usable language models requires huge amounts of text material, especially for the higher order n-grams. When generating n-gram probabilities through the maximum likelihood estimates, the estimates for n-grams that are seen in the training text tend to be too high and the estimates for the n-grams that are too low. This imbalance is often corrected by taking some probability mass from the seen events and redistribute it to all the unseen events. This is called language model smoothing. More information of AM and LM adaptation can be found in Mansikkaniemi, Acoustic Model and Language Model Adaptation for a Mobile Dictation Service, Master's thesis, Aalto University, 2010.

Thus, the automatic speech recognition tries to match sounds with word sequences. The language model provides context to distinguish between words and phrases that sound similar.

The output of the automatic speech recognition is the identified user preferences. The user and group identifiers are used together with the confidence measures in the user profile management. In more detail, one or more user profiles are selected based on the user and group identifiers and the confidence measures. The selected user profile(s) may then be updated based on the user preferences output from the automatic speech recognition.

Another aspect of the embodiments relates to a device for managing user profiles. The device is configured to calculate, for an audio segment, a user confidence measure representing a probability that the audio segment comprises speech of a user. The device is also configured to calculate, for the audio segment, a group confidence measure representing a probability that the audio segment comprises speech of a group of users. The device is further configured to manage a user profile based on a comparison between the user confidence measure and a user confidence threshold and between the group confidence measure and a group confidence threshold.

In an embodiment, the device is configured to calculate, for the audio segment and for each user of a set of users, a respective user confidence measure representing a respective probability that the audio segment comprises speech of the user. The device is, in this embodiment, also configured to select a user confidence measure representing a highest probability among the respective calculated user confidence measures.

In an embodiment, the device is configured to calculate, for the audio segment and for each group of users of a set of groups of users, a respective group confidence measure representing a respective probability that the audio segment comprises speech of the group of users. The device is, in this embodiment, also configured to select a group confidence measure representing a highest probability among the respective calculated group confidence measures.

In an embodiment, the device is configured to calculate, for the audio segment, a gender group confidence measure representing a probability that the audio segment comprises speech of a male user or of a female user.

In an embodiment, the device is configured to calculate, for the audio segment, an age group confidence measure representing a probability that the audio segment comprises speech of an adult user or of a child user.

In an embodiment, the device is configured to select a user profile based on the comparison between the user confidence measure and the user confidence threshold and between the group confidence measure and the group confidence threshold.

In an embodiment, the device is configured to select a user profile of an individual user if a probability represented by the user confidence measure is higher than a threshold probability represented by the user confidence threshold. The device is, in this embodiment, also configured to select a user profile of a group of users if the probability represented by the user confidence measure is not higher than the threshold probability represented by the user confidence threshold but a probability represented by the group confidence measure is higher than a threshold probability represented by the group confidence threshold.

In an embodiment, the device is configured to calculate, for the audio segment and for each user having a respective user identifier of a set of users, a respective user confidence measure representing a respective probability that the audio segment comprises speech of the user. The device is also configured to select a user identifier of a user of the set of users having a user confidence measure representing a highest probability among the respective user confidence measures. The device is further configured to calculate, for the audio segment and for each group of users having a respective group identifier of a set of groups of users, a respective group confidence measure representing a respective probability that the audio segment comprises speech of the group of users. The device is additionally configured to select a group identifier of a group of users of the set of groups of users having a group confidence measure representing a highest probability among the respective group confidence measures. The device is also configured to select, based on the selected user identifier, a user profile of an individual user if a probability represented by the user confidence measure is higher than a threshold probability represented by the user confidence threshold. The device is further configured to select, based on the group identifier, a user profile of a group of users if the probability represented by the user confidence measure is not higher than the threshold probability represented by the user confidence threshold but a probability represented by the group confidence measure is higher than a threshold probability represented by the group confidence threshold.

In an embodiment, the device is configured to identify user preferences by analyzing the audio segment. The device is, in this embodiment, also configured to update the user profile with the user preferences based on the comparison between the user confidence measure and the user confidence threshold and between the group confidence measure and the group confidence threshold.

In an embodiment, the device is configured to select a user profile of an individual user if a probability represented by the user confidence measure is higher than a threshold probability represented by the user confidence threshold. The device is also configured to select a user profile of a group of users if a probability represented by the group confidence measure is higher than a threshold probability represented by the group confidence threshold. The device is further configured to update the selected user profile(s) with the user preferences.

It will be appreciated that the methods, method steps and devices, device functions described herein can be implemented, combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Alternatively, or as a complement, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g., by reprogramming of the existing software or by adding new software components.

Figure 11:
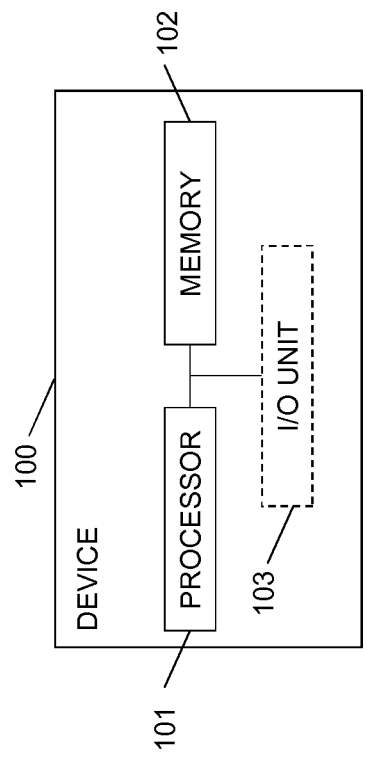
FIG. 11 is a schematic block diagram of a device for managing user profiles according to an embodiment.

FIG. 11 is a schematic block diagram illustrating an example of a device 100 for managing user profiles based on a processor-memory implementation according to an embodiment. In this particular example, the device 100 comprises a processor 101, such as processing circuitry, and a memory 102. The memory 102 comprises instructions executable by the processor 101.

In an embodiment, the processor 101 is operative to calculate the user confidence measure and calculate the group confidence measure. The processor 101 is also operative to manage the user profile as disclosed herein.

Optionally, the device 100 may also include a communication circuit, represented by an input/output (I/O) unit 103 in FIG. 11. The I/O unit 103 may include functions for wired and/or wireless communication with other devices and/or network nodes in a wired or wireless communication network. In a particular example, the I/O unit 103 may be based on radio circuitry for communication with one or more other nodes, including transmitting and/or receiving information. The I/O unit 103 may be interconnected to the processor 101 and/or memory 102. By way of example, the I/O unit 103 may include any of the following: a receiver, a transmitter, a transceiver, I/O circuitry, input port(s) and/or output port(s).

Figure 12:
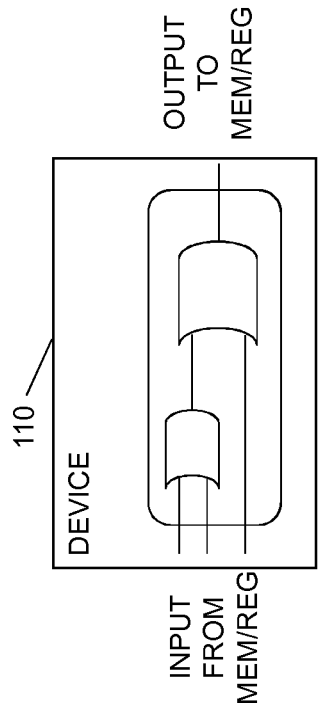
FIG. 12 is a schematic block diagram of a device for managing user profiles according to another embodiment.

FIG. 12 is a schematic block diagram illustrating another example of a device 110 for managing user profiles based on a hardware circuitry implementation according to an embodiment. Particular examples of suitable hardware circuitry include one or more suitably configured or possibly reconfigurable electronic circuitry, e.g., Application Specific Integrated Circuits (ASICs), FPGAs, or any other hardware logic such as circuits based on discrete logic gates and/or flip-flops interconnected to perform specialized functions in connection with suitable registers (REG), and/or memory units (MEM).

Figure 13:
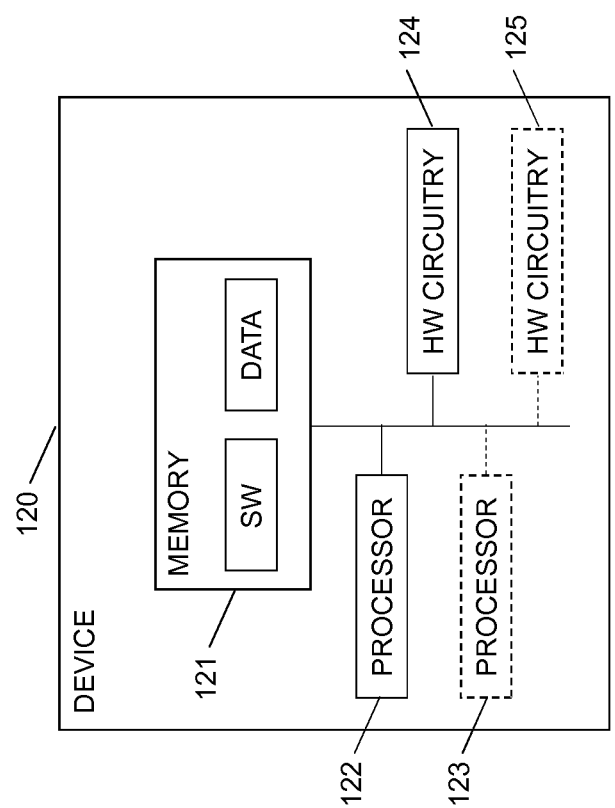
FIG. 13 is a schematic block diagram of a device for managing user profiles according to a further embodiment.

FIG. 13 is a schematic block diagram illustrating yet another example of a device 120 for managing user profiles based on combination of both processor(s) 122, 123 and hardware circuitry 124, 125 in connection with suitable memory unit(s) 121. The device 120 comprises one or more processors 122, 123, memory 121 including storage for software (SW) and data, and one or more units of hardware circuitry 124, 125. The overall functionality is thus partitioned between programmed software for execution on one or more processors 122, 123, and one or more pre-configured or possibly reconfigurable hardware circuits 124, 125. The actual hardware-software partitioning can be decided by a system designer based on a number of factors including processing speed, cost of implementation and other requirements.

Figure 14:
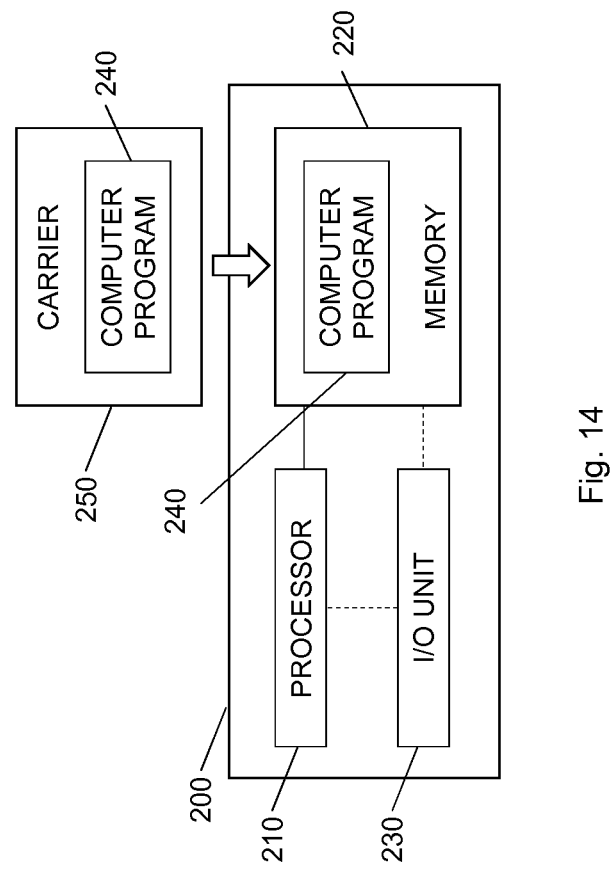
FIG. 14 is a schematic block diagram of a computer program based implementation of an embodiment.

FIG. 14 is a schematic diagram illustrating an example of a device 200 for managing user profiles according to an embodiment. In this particular example, at least some of the steps, functions, procedures, modules and/or blocks described herein are implemented in a computer program 240, which is loaded into the memory 220 for execution by processing circuitry including one or more processors 210. The processor(s) 210 and memory 220 are interconnected to each other to enable normal software execution.

An optional I/O unit 230 may also be interconnected to the processor(s) 210 and/or the memory 220 to enable input and/or output of relevant data, such as audio streams, audio segments, user profiles.

The term 'processor' should be interpreted in a general sense as any circuitry, system or device capable of executing program code or computer program instructions to perform a particular processing, determining or computing task.

The processing circuitry including one or more processors 210 is thus configured to perform, when executing the computer program 240, well-defined processing tasks such as those described herein.

The processing circuitry does not have to be dedicated to only execute the above-described steps, functions, procedure and/or blocks, but may also execute other tasks.

In a particular embodiment, the computer program 240 comprises instructions, which when executed by at least one processor 210, cause the at least one processor 210 to calculate, for an audio segment, a user confidence measure representing a probability that the audio segment comprises speech of a user. The at least one processor 210 is also caused to calculate, for the audio segment, a group confidence measure representing a probability that the audio segment comprises speech of a group of users. The at least one processor 210 is further caused to manage a user profile based on a comparison between the user confidence measure and a user confidence threshold and between the group confidence measure and a group confidence threshold.

The proposed technology also provides a carrier 250 comprising the computer program 240. The carrier 250 is one of an electronic signal, an optical signal, an electromagnetic signal, a magnetic signal, an electric signal, a radio signal, a microwave signal, or a computer-readable storage medium.

By way of example, the software or computer program 240 may be realized as a computer program product, which is normally carried or stored on a computer-readable medium 250, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program 240 may thus be loaded into the operating memory 220 of a device 200 for execution by the processing circuitry 210 thereof.

The flow diagram or diagrams presented herein may be regarded as a computer flow diagram or diagrams, when performed by one or more processors. A corresponding device may be defined as a group of function modules, where each step performed by the processor corresponds to a function module. In this case, the function modules are implemented as a computer program running on the processor.

The computer program residing in memory may, thus, be organized as appropriate function modules configured to perform, when executed by the processor, at least part of the steps and/or tasks described herein.

FIG. 15 is a schematic block diagram of a device 130 for managing user profiles according to an embodiment. The device 130 comprises a user confidence measure module 131 for calculating, for an audio segment, a user confidence measure representing a probability that the audio segment comprises speech of a user. The device 130 also comprises a group confidence measure module 132 for calculating, for the audio segment, a group confidence measure representing a probability that the audio segment comprises speech of a group of users. The device 130 further comprises a user profile module 133 for managing a user profile based on a comparison between the user confidence measure and a user confidence threshold and between the group confidence measure and a group confidence threshold.

A further aspect of the embodiments, see FIG. 16, relates to a user equipment 300 comprising a device 100 for managing user profiles according to any of the embodiments, such as disclosed herein in connection with FIGS. 11 to 15. In an embodiment, the user equipment is selected from a group consisting of a computer, a laptop, a smart phone, a mobile phone, a tablet, an audio player, a multimedia player, a set-top box, and a game console. In a particular embodiment, the user equipment is intended to be installed in a home environment and is preferably a set-top box or a game console.

It is also becoming increasingly popular to provide computing services (hardware and/or software) in network devices, such as network nodes and/or servers where the resources are delivered as a service to remote locations over a network. By way of example, this means that functionality, as described herein, can be distributed or re-located to one or more separate physical nodes or servers. The functionality may be re-located or distributed to one or more jointly acting physical and/or virtual machines that can be positioned in separate physical node(s), i.e., in the so-called cloud. This is sometimes also referred to as cloud computing, which is a model for enabling ubiquitous on-demand network access to a pool of configurable computing resources such as networks, servers, storage, applications and general or customized services.

There are different forms of virtualization that can be useful in this context, including one or more of:
  Consolidation of network functionality into virtualized software running on customized or generic hardware. This is sometimes referred to as network function virtualization.
  Co-location of one or more application stacks, including operating system, running on separate hardware onto a single hardware platform. This is sometimes referred to as system virtualization, or platform virtualization.
  Co-location of hardware and/or software resources with the objective of using some advanced domain level scheduling and coordination technique to gain increased system resource utilization. This is sometimes referred to as resource virtualization, or centralized and coordinated resource pooling.

Although it may often desirable to centralize functionality in so-called generic data centres, in other scenarios it may in fact be beneficial to distribute functionality over different parts of the network.

A network device may generally be seen as an electronic device being communicatively connected to other electronic devices in the network. By way of example, the network device may be implemented in hardware, software or a combination thereof. For example, the network device may be a special-purpose network device or a general purpose network device, or a hybrid thereof.

A special-purpose network device may use custom processing circuits and a proprietary operating system (OS), for execution of software to provide one or more of the features or functions disclosed herein.

A general purpose network device may use common off-the-shelf (COTS) processors and a standard OS, for execution of software configured to provide one or more of the features or functions disclosed herein.

By way of example, a special-purpose network device may include hardware comprising processing or computing resource(s), which typically include a set of one or more processors, and physical network interfaces (N Is), which sometimes are called physical ports, as well as non-transitory machine readable storage media having stored thereon software. A physical NI may be seen as hardware in a network device through which a network connection is made, e.g. wirelessly through a wireless network interface controller (WNIC) or through plugging in a cable to a physical port connected to a network interface controller (NIC). During operation, the software may be executed by the hardware to instantiate a set of one or more software instance(s). Each of the software instance(s), and that part of the hardware that executes that software instance, may form a separate virtual network element.

By way of another example, a general purpose network device may, for example, include hardware comprising a set of one or more processor(s), often COTS processors, and network interface controller(s) (NICs), as well as non-transitory machine readable storage media having stored thereon software. During operation, the processor(s) executes the software to instantiate one or more sets of one or more applications. While one embodiment does not implement virtualization, alternative embodiments may use different forms of virtualization—for example represented by a virtualization layer and software containers. For example, one such alternative embodiment implements operating system-level virtualization, in which case the virtualization layer represents the kernel of an operating system, or a shim executing on a base operating system, that allows for the creation of multiple software containers that may each be used to execute one of a sets of applications. In an example embodiment, each of the software containers, also called virtualization engines, virtual private servers, or jails, is a user space instance, typically a virtual memory space. These user space instances may be separate from each other and separate from the kernel space in which the operating system is executed; the set of applications running in a given user space, unless explicitly allowed, cannot access the memory of the other processes. Another such alternative embodiment implements full virtualization, in which case: 1) the virtualization layer represents a hypervisor, sometimes referred to as a Virtual Machine Monitor (VMM), or the hypervisor is executed on top of a host operating system; and 2) the software containers each represent a tightly isolated form of software container called a virtual machine that is executed by the hypervisor and may include a guest operating system.

A hypervisor is the software/hardware that is responsible for creating and managing the various virtualized instances and in some cases the actual physical hardware. The hypervisor manages the underlying resources and presents them as virtualized instances. What the hypervisor virtualizes to appear as a single processor may actually comprise multiple separate processors. From the perspective of the operating system, the virtualized instances appear to be actual hardware components.

A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes.

The instantiation of the one or more sets of one or more applications as well as the virtualization layer and software containers if implemented, are collectively referred to as software instance(s). Each set of applications, corresponding software container if implemented, and that part of the hardware that executes them (be it hardware dedicated to that execution and/or time slices of hardware temporally shared by software containers), forms a separate virtual network element(s).

The virtual network element(s) may perform similar functionality compared to Virtual Network Element(s) (VNEs). This virtualization of the hardware is sometimes referred to as Network Function Virtualization (NFV)). Thus, NFV may be used to consolidate many network equipment types onto industry standard high volume server hardware, physical switches, and physical storage, which could be located in data centers, NDs, and Customer Premise Equipment (CPE). However, different embodiments may implement one or more of the software container(s) differently. For example, while embodiments are illustrated with each software container corresponding to a VNE, alternative embodiments may implement this correspondence or mapping between software container-VNE at a finer granularity level; it should be understood that the techniques described herein with reference to a correspondence of software containers to VNEs also apply to embodiments where such a finer level of granularity is used.

According to yet another embodiment, there is provided a hybrid network device, which includes both custom processing circuitry/proprietary OS and COTS processors/standard OS in a network device, e.g. in a card or circuit board within a network device ND. In certain embodiments of such a hybrid network device, a platform Virtual Machine (VM), such as a VM that implements functionality of a special-purpose network device, could provide for para-virtualization to the hardware present in the hybrid network device.

FIG. 17 is a schematic diagram illustrating an example of how functionality can be distributed or partitioned between different network devices in a general case. In this example, there are at least two individual, but interconnected network devices 310, 311, which may have different functionalities, or parts of the same functionality, partitioned between the network devices 310, 311. There may be additional network device 312 being part of such a distributed implementation. The network devices 300, 311, 312 may be part of the same wireless or wired communication system, or one or more of the network devices may be so-called cloud-based network devices located outside of the wireless or wired communication system.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

The invention claimed is:

1. A method, implemented by a computing device, the method comprising:
   calculating, for an audio segment, a user confidence measure representing a probability that the audio segment comprises speech spoken by a user having a user profile managed by the computing device;
   responsive to the user confidence measure being less than a user confidence threshold, calculating, for the audio segment, a group confidence measure representing a probability that the audio segment comprises speech spoken by someone belonging to a group of users in which each user of the group has a respective user profile managed by the computing device; and
   responsive to the group confidence measure being above a group confidence threshold, managing a group profile corresponding to the group of users.

2. The method of claim 1, wherein the group of users has common voice characteristics.

3. The method of claim 1, wherein the calculating the user confidence measure comprises:
   calculating, for the audio segment and for each user of a set of users in which each user in the set has a respective user profile managed by the computing device, a respective measure representing a respective probability that the audio segment comprises speech spoken by the user; and
   selecting, as the user confidence measure, the respective measure representing a highest probability among the respective measures calculated for the users in the set of users.

4. The method of claim 1, wherein the calculating the group confidence measure comprises:
   calculating, for the audio segment and for each group of users of a set of groups of users, a respective measure representing a respective probability that the audio segment comprises speech spoken by someone belonging to the group of users; and
   selecting, as the group confidence measure, the respective measure representing a highest probability among the respective measures calculated for the groups in the set of groups.

5. The method of claim 1, wherein the calculating the group confidence measure comprises calculating, for the audio segment, a gender group confidence measure representing a probability that the audio segment comprises speech of a male user or of a female user.

6. The method of claim 1:
   further comprising identifying user preferences by analyzing the audio segment;
   wherein managing the group profile comprises updating the group profile with the user preferences based on a comparison between the user confidence measure and the user confidence threshold and between the group confidence measure and the group confidence threshold.

7. A computing device comprising:
processing circuitry;
memory containing instructions executable by the processing circuitry whereby the computing device is operative to:
calculate, for an audio segment, a user confidence measure representing a probability that the audio segment comprises speech spoken by a user having a user profile managed by the computing device;
responsive to the user confidence measure being less than a user confidence threshold, calculate, for the audio segment, a group confidence measure representing a probability that the audio segment comprises speech spoken by someone belonging to a group of users in which each user of the group has a respective user profile managed by the computing device; and
responsive to the group confidence measure being above a group confidence threshold, manage a group profile corresponding to the group of users.

8. The computing device of claim 7, wherein the instructions are such that the computing device is operative to:
calculate, for the audio segment and for each user of a set of users in which each user in the set has a respective user profile managed by the computing device, a respective measure representing a respective probability that the audio segment comprises speech spoken by the user; and
select, as the user confidence measure, the respective measure representing a highest probability among the respective measures calculated for the users in the set of users.

9. The computing device of claim 7, wherein the instructions are such that the computing device is operative to:
calculate, for the audio segment and for each group of users of a set of groups of users, a respective measure representing a respective probability that the audio segment comprises speech spoken by someone belonging to the group of users; and
select, as the group confidence measure, the respective measure representing a highest probability among the respective measures calculated for the groups in the set of groups.

10. The computing device of claim 7, wherein the instructions are such that the computing device is operative to calculate, for the audio segment, a gender group confidence measure representing a probability that the audio segment comprises speech of a male user or of a female user.

11. The computing device of claim 7, wherein the instructions are such that the computing device is operative to calculate, for the audio segment, an age group confidence measure representing a probability that the audio segment comprises speech of an adult user or of a child user.

12. The computing device of claim 7, wherein the instructions are such that the computing device is operative to:
identify user preferences by analyzing the audio segment; and
update the group profile with the user preferences based on the comparison between the user confidence measure and the user confidence threshold and between the group confidence measure and the group confidence threshold.

13. A user equipment, comprising:
processing circuitry and memory containing instructions executable by the processing circuitry whereby the user equipment is operative to:
calculate, for an audio segment, a user confidence measure representing a probability that the audio segment comprises speech spoken by a user having a user profile managed by the user equipment;
responsive to the user confidence measure being less than a user confidence threshold, calculate, for the audio segment, a group confidence measure representing a probability that the audio segment comprises speech spoken by someone belonging to a group of users in which each user of the group has a respective user profile managed by the user equipment; and
responsive to the group confidence measure being above a group confidence threshold, manage a group profile corresponding to the group of users,
wherein the user equipment is selected from a group consisting of a computer, a laptop, a smart phone, a mobile phone, a tablet, an audio player, a multimedia player, a set-top box, and a game console.

* * * * *